US006661278B1

(12) United States Patent
Gilliland

(10) Patent No.: US 6,661,278 B1
(45) Date of Patent: Dec. 9, 2003

(54) HIGH VOLTAGE CHARGE PUMP CIRCUIT

(75) Inventor: Troy Gilliland, New Castle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 10/191,779

(22) Filed: Jul. 8, 2002

(51) Int. Cl.[7] ................................................. G05F 1/10
(52) U.S. Cl. ....................................................... 327/536
(58) Field of Search ................................. 327/530, 534, 327/535, 536

(56) References Cited

U.S. PATENT DOCUMENTS

| | | | | |
|---|---|---|---|---|
| 5,029,063 | A | | 7/1991 | Lingstaedt et al. ........... 363/60 |
| 6,023,188 | A | | 2/2000 | Lee et al. ..................... 327/536 |
| 6,046,626 | A | * | 4/2000 | Saeki et al. .................. 327/536 |
| 6,177,830 | B1 | | 1/2001 | Rao ............................. 327/536 |
| 2001/0011919 | A1 | * | 8/2001 | Tanimoto ..................... 327/536 |

OTHER PUBLICATIONS

John F. Dickson, "On–Chip High–Voltage Generation in MNOS Integrated Circuits Using an Improved Voltage Multiplier Technique", IEEE Journal of Solid–State Circuits, vol. SC–11, No. 3, Jun. 1976, pp. 374–378.
Johan S. Witters, et al., "Analysis and Modeling of On–Chip High–Voltage Generator Circuits for Use in EEPROM Circuits", IEEE Journal of Solid–State Circuits, vol. 24, No. 5, Oct. 1989, pp. 1372–1380.
Akira Umezawa, et al., "A 5–V–Only Operation 0.6–$\mu$m Flash EEPROM with Row Decoder Scheme in Triple–Well Structure", IEEE Journal of Solid–State Circuits, vol. 27, No. 11, Nov. 1992, pp. 1540–1546.
M. Declercq, et al., "Design and Optimization of High–Voltage CMOS Devices Compatible with a Standard 5 V CMOS Technology", IEEE Custom Integrated Circuits Conference, 1993, pp. 24.6.1–24.6.4.

Katsuhiko Ohsaki, et al., "A Single Poly EEPROM Cell Structure for Use in Standard CMOS Processes", IEEE Jounal of Solid–State Circuits, vol. 29, No. 3, Mar. 1994, pp. 311–316.
Chi–Chang Wang, et al., "Efficiency Improvement in Charge Pump Circuits", IEEE Journal of Solid–State Circuits, vol. 32, No. 6, Jun. 1997, pp. 852–860.
Pierre Favrat, et al., "A High–Efficiency CMOS Voltage Doubler", IEEE Journal of Solid–State Circuits, vol. 33, No. 3, Mar. 1998, pp. 410–416.
Jieh–Tsorng Wu, et al., "MOS Charge Pumps for Low–Voltage Operation", IEEE Journal of Solid–State Circuits, vol. 33, No. 4, Apr. 1998, pp. 592–597.
Cedric Bassin, et al., "High–Voltage Devices for 0.5–$\mu$m Standard CMOS Technology", IEEE Electron Device Letters, vol. 21, No. 1, Jan. 2000, pp. 41–42.
Vittoz, "Dynamic Analog Techniques", Design of Analog-Digital VLSI Circuits for Telecommunications and Signal Processing, Chapter 4, 1994, pp. 97–124.

* cited by examiner

Primary Examiner—Jeffrey Zweizig
(74) Attorney, Agent, or Firm—Thelen Reid & Priest LLP; David B. Ritchie

(57) ABSTRACT

A switch element of a charge pump circuit includes (1) an NMOS transistor controlled by a first clock signal coupled between a first node and a first fixed voltage level, (2) a first PMOS well transistor controlled by a second clock signal coupled between the first node and a voltage output node, and (3) a second PMOS well transistor controlled by the first node and coupled between a voltage input node and the voltage output node. The wells of both the first and second PMOS well transistors are coupled to the voltage output node to provide reverse isolation.

32 Claims, 6 Drawing Sheets

FIG. 4A
(Prior Art)
FIG. 4B
(Prior Art)
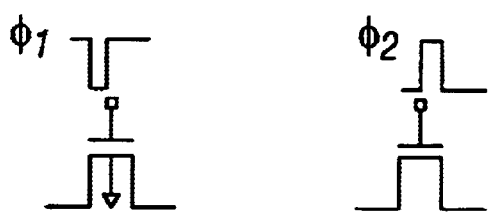
FIG. 5A
(Prior Art)
FIG. 5B
(Prior Art)
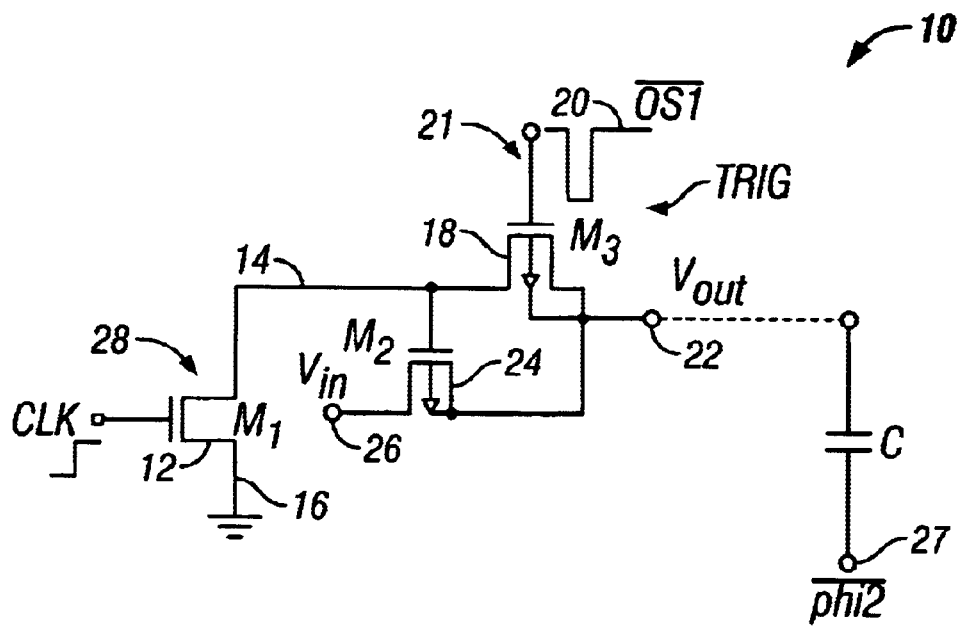
FIG. 6A

HIGH VOLTAGE CHARGE PUMP CIRCUIT

FIELD OF THE INVENTION

The present invention is directed to a charge pump circuit for providing relatively high voltage to a circuit on an integrated circuit from relatively low input voltage sources.

BACKGROUND OF THE INVENTION

Charge pump circuits are well known in the prior art. Such circuits are used for generating voltages greater than those available at the power supply. On an integrated circuit chip such circuits are quite important where a particular circuit requires a voltage in excess of the Vdd voltage normally available to the chip. The erase circuit, for example, for nonvolatile memory often requires a voltage well in excess of Vdd because the Fowler-Nordheim tunneling process used for erasing the floating gate of such memory usually requires a relatively high voltage compared to Vdd.

In generating large on-chip voltages (i.e., in excess of twice Vdd) for use within standard CMOS processes (single n-well and single poly), solutions exist that individually address the reliability, efficiency and maximum-attainable voltage (i.e., the n-well/p-substrate reverse-bias breakdown voltage) issues for a specific implementation. No single solution is known, however, that simultaneously provides a good solution to all three of these issues. Typically the available circuitry is either highly efficient but provides a relatively low maximum attainable voltage or the circuitry is relatively inefficient but provides a relatively high maximum attainable voltage. New portable and wireless electronic products require both high efficiency (for extended battery powered operation) and high voltage.

In generating on-chip voltages larger than Vdd, charge is stored on capacitors, transferred through consecutive stages, providing a voltage at the final output stage, which is dependant upon the number of stages and the gain and efficiency of each stage. Two basic well-known approaches are the Dickson Voltage Multiplier circuit (Dickson, John F., "On-Chip High-Voltage Generation in MNOS Integrated Circuits Using an Improved Voltage Multiplier Technique", IEEE Journal of Solid-State Circuits, Vol. SC-11, No. 3, June 1976, pp. 374–378) and the Voltage Tripler.

An example of the Dickson voltage multiplier circuit is illustrated in schematic form in FIG. 1. The two clock signals phi1 and phi2 are typically out of phase with one another and have amplitude Vphi as illustrated in FIG. 2 and the switches S1, S2, . . . , Sn-1 and Sn may be implemented with diodes or transistors. The multiplier operates by pumping packets of charge from stage to successive stage as the coupling capacitors C1, C2, . . . , Cn-1, Cn are successively charged and discharged during each half of the clock cycle. Because the voltages are allowed to grow from stage to stage, the average potentials at the end of each stage grow from input to output.

An example of the basic voltage tripler circuit is illustrated at FIG. 3. Using the same basic approach as the Dickson voltage multiplier circuit, each stage typically incorporates two capacitors, C1 and C2 and five switches, S1, S2, S3, S4 and S5. Switches S1, S2 and S3 are controlled by the clock signal phi2 while switches S4 and S5 are controlled by clock signal phi1 (the timing diagram of FIG. 2 works for this version as well). When Phi2 causes switches S1, S2 and S3 to close, C1 and C2 charge. When Phi2 opens switches S1, S2 and S3 and Phi1 closes switches S4 and S5 charge is passed along to the next stage.

The problems in creating voltages in excess of Vdd revolve around the efficiency, reliability and isolation provided by the "switch" element used to transfer charge from stage to consecutive stage. FIG. 4A illustrates the configuration of a prior art charge-transfer switch in the form of a PMOS diode. FIG. 4B illustrates the configuration of a prior art charge-transfer switch in the form of a NMOS diode. This approach provides relatively good backwards isolation typical of diodes, however the fixed voltage drop Vd, also typical of diodes, reduces the voltage gain per stage.

Turning now to FIGS. 5A and 5B, implementations of MOS switches are illustrated schematically. FIG. 5A shows a PMOS switch under the control of clock signal $\phi_1$ (sometimes referred to herein as phi1) and FIG. 5B shows a NMOS switch under the control of clock signal $\phi_2$ (sometimes referred to herein as phi2). These switch elements have the advantage of a high gain per stage due to a lower voltage drop than is experienced with diodes, however they provide no voltage isolation beyond Vdd-Vd. In the case of a PMOS device, the lack of isolation comes from the fact that the well can be forward biased if the drain potential gets higher than the well potential. This case is reversed for an NMOS device within an n-well process as the well (substrate in this case) can only be forward biased if the drain potential is below that of the well/substrate. The NMOS within a single n-well process cannot be used for high-voltage generation because it cannot float (i.e., be isolated within its own well).

Accordingly, the present invention is directed to a voltage multiplier charge pump circuit for on-chip use, which exhibits efficiency and relatively high voltage output.

BRIEF DESCRIPTION OF THE INVENTION

In accordance with a first aspect of the invention, a novel switch element includes (1) an NMOS transistor controlled by a first clock signal coupled between a first node and a first fixed voltage level, (2) a first PMOS well transistor controlled by a second clock signal (which may be a one shot type signal—a one-shot signal as used herein is a single pulse of short duration (compared to the clocking period) that is triggered by a clock edge) coupled between the first node and a voltage output node, and (3) a second PMOS well transistor controlled by the first node and coupled between a voltage input node and the voltage output node. The wells of both the first and second PMOS well transistors are coupled to the voltage output node to provide reverse isolation. In accordance with a second aspect of the present invention, a voltage multiplier circuit incorporates plural stages of the novel switch element to provide a multiplication of an input voltage. In accordance with a third aspect of the invention, a method of operation for the voltage multiplier circuit is provided.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4A illustrates the configuration of a charge-transfer switch in the form of a PMOS diode.

FIG. 4B illustrates the configuration of a charge-transfer switch in the form of a NMOS diode.

FIG. 5A illustrates the configuration of a charge-transfer switch in the form of a PMOS switch element.

FIG. 5B illustrates the configuration of a charge-transfer switch in the form of a NMOS switch element.

FIG. 6A is a schematic diagram of a switching element for use in a charge pump circuit in accordance with one embodiment of the present invention.

DETAILED DESCRIPTION

Figure 1:
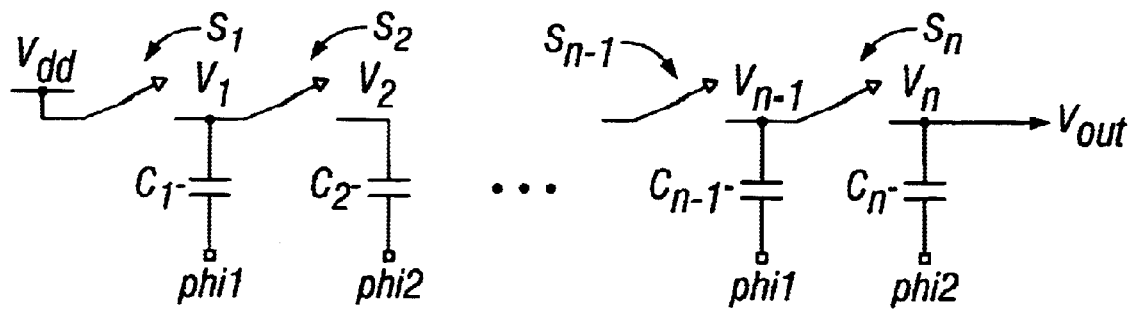
FIG. 1 is a simplified schematic diagram of a prior art Dickson voltage multiplier circuit.
Figure 2:
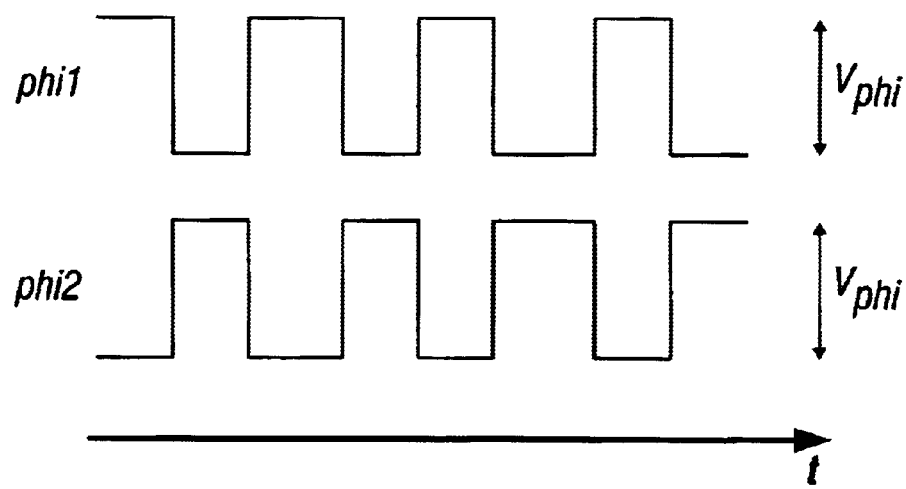
FIG. 2 is a timing diagram illustrating the amplitude and timing of nonoverlapping charge pumping signals phi1 and phi2 applicable to FIGS. 1 and 3.
Figure 3:
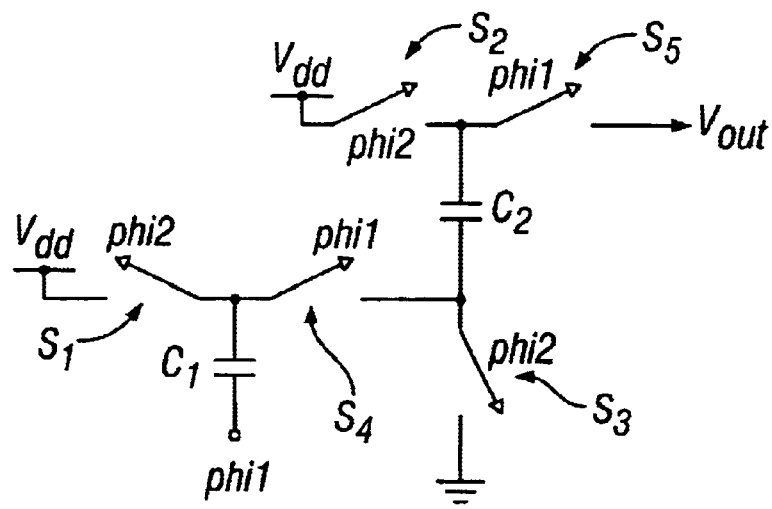
FIG. 3 is an electrical schematic diagram of a prior art voltage tripler circuit.

Embodiments of the present invention are described herein in the context of a charge pump circuit for providing a relatively high voltage Vpp>Vdd on the substrate of a semiconductor integrated circuit chip. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As discussed above, diode voltage drop makes diodes a relatively poor choice for an efficient voltage multiplier charge pump circuit. NMOS switches are problematic because a relatively high voltage referred to the substrate is required to turn them on. Such high voltages can pose a reliability issue over time. PMOS switches are potentially desirable for this application. They float in their own n-well in the substrate and thus do not take a lot of voltage to turn on (i.e., they exhibit no body effect) and they have no diode drop issue. They do, however, have a reverse isolation problem. If the well is tied to the source and more than Vdd is applied to the drain, they tend to act like a clamp since the drain to well junction becomes forward biased under these conditions. Connecting the well to the drain rather than to the source can solve this, but then the device becomes hard to turn off.

Turning now to FIG. 6A, a switching element 10 is shown schematically which can be used as a switching element in one or multiple stages of a charge pump circuit. This novel switch element includes (1) an NMOS transistor 12 controlled by a first clock signal coupled between a first node 14 and a first fixed voltage level 16 (here shown as ground), (2) a first PMOS well transistor 18 controlled at node 21 by a second clock signal 20 (which may be a one shot type signal) coupled between the first node (source) and a voltage output node 22 (drain), and (3) a second PMOS well transistor 24 controlled by the first node and coupled between a voltage input node 26 (source) and the voltage output node (drain). Each of the PMOS well transistors 18 and 24 preferably has its well connected to its drain as shown in the schematic. The drain 28 of NMOS transistor 12 is preferably disposed in an n-well in order to withstand more than three times the standard Vds (drain-source voltage) and Vdg (drain-gate voltage) of standard NMOS. In summary, the switched PMOS-diode is used as a normal switch during the charging phase and uses its own gate capacitance as a storage node during the off-phase (i.e., it acts like a reverse-biased diode). These properties, combined with isolation of the n-well as the PMOS-diode's bulk create the possibility of efficiently and reliably generating on-chip voltages within a standard CMOS (single-poly, single n-well) process up to the reverse breakdown voltage of the n-well/p-substrate diode without any additional mask steps or processing.

Figure 6B:
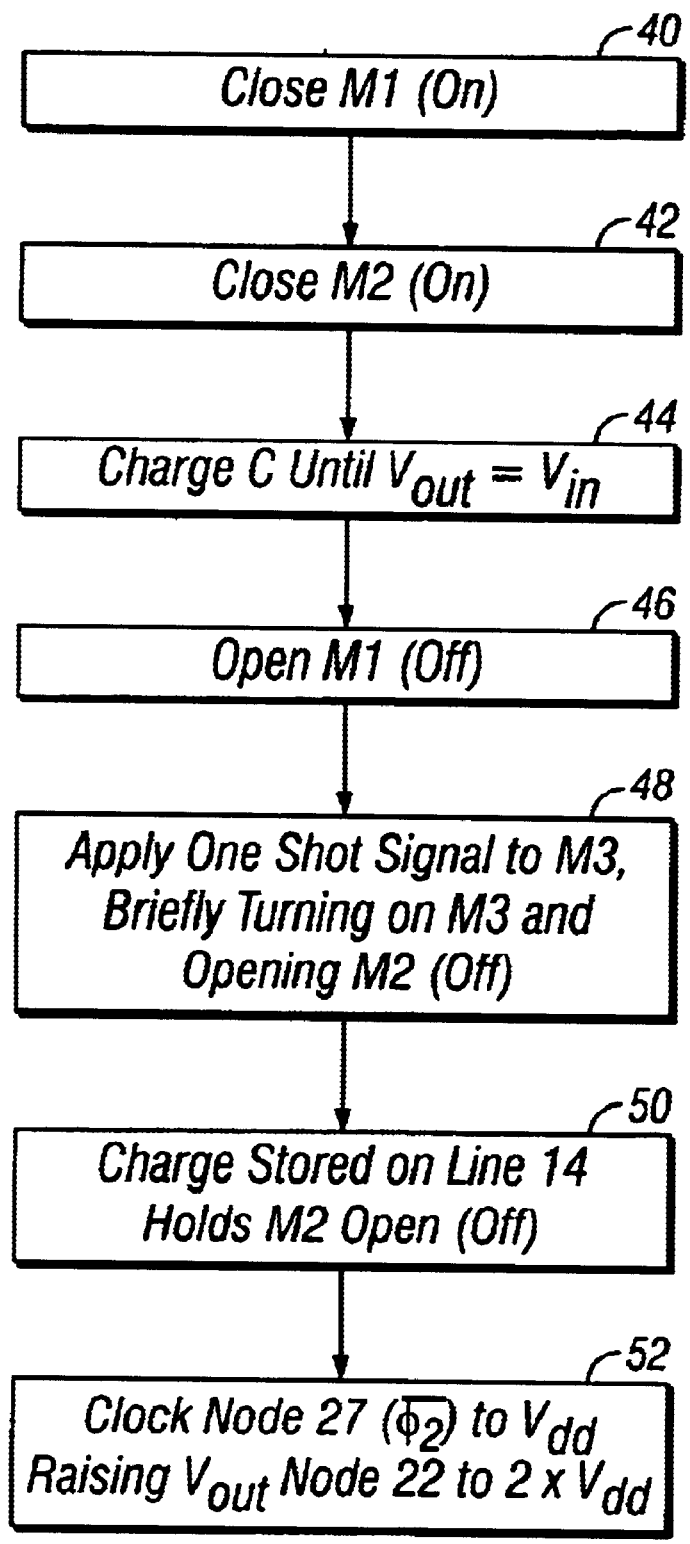
FIG. 6B is a flow diagram showing the operation of the switching element of FIG. 6A.

Turning now to FIG. 6B, a flow diagram illustrating the operation of the switching element circuit of FIG. 6A is provided. Switching element 10 works as follows: M1 is closed, turning it on (40) and taking line 14 to ground. This closes M2 turning it on (42). Capacitor C charges up until Vout at node 22 is equal to Vin at node 26 (44). M1 is now opened, turning it off and decoupling line 14 from ground (46). A one-shot signal 20 (OS1BAR or ONESHOT1BAR) is now applied (48) to the gate of M3 at node 21, momentarily turning on M3 and thereby opening/turning off M2 and decoupling node 22 from node 26. Now the charge stored on line 14 holds M2 open (off) (50) thus isolating node 22. Finally, a clock signal PHI2BAR of up to magnitude Vdd is applied at node 27 to the bottom of capacitor C thus raising the voltage at node 22 (Vout) to a level of up to 2×Vdd (52) to achieve the desired charge pumping. This elevated voltage may now be passed on to the next stage, or used directly. The cycle may then be repeated. The clocking signals may operate continuously or, more efficiently, on demand as will now be apparent to those of ordinary skill in the art. Those of ordinary skill in the art will also appreciate that there is no requirement that the PHI2 signal have a magnitude of Vdd but may have a lesser magnitude if desired by the particular application at hand.

The clocking signals referred to herein are commonly generated in all types of digital circuits and are well understood by those of ordinary skill in the art. Many schemes for generating such signals are well known and will not be repeated here to avoid overcomplicating the disclosure.

Figure 7A:
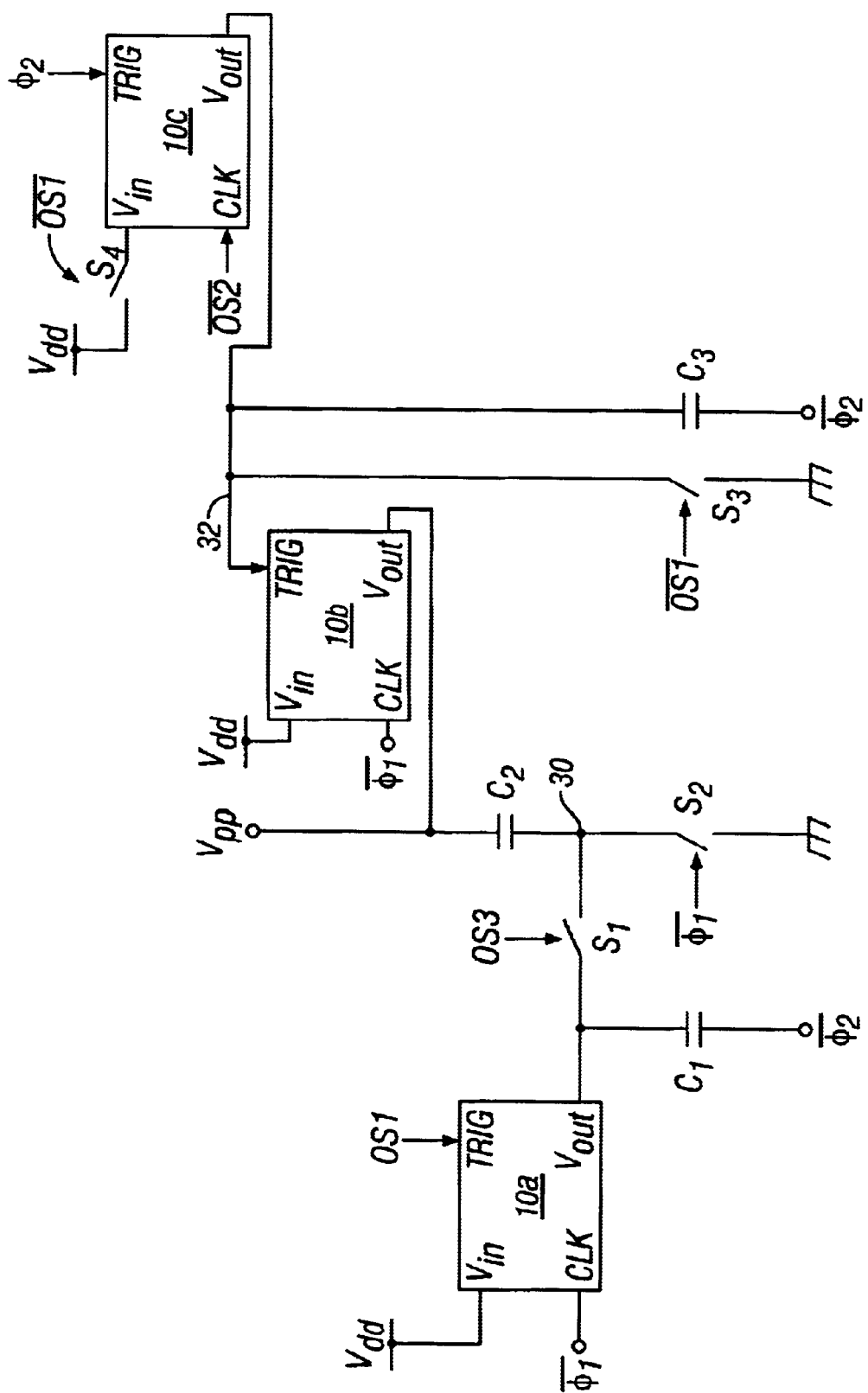
FIG. 7A is a simplified schematic diagram of a voltage tripler circuit in accordance with one embodiment of the present invention.

Turning now to FIG. 7A a simplified schematic diagram illustrates an implementation of a multi-stage voltage multiplier charge pump circuit using the building blocks of switching element 10 (10a, 10b and 10c). As shown, each switching element 10 has an input voltage node, a trigger input node, a clock input node. and an output voltage node. A first pumping signal provides the clock input; a second pumping signal provides the trigger input.

In more detail, switching element 10a has its input voltage node coupled to Vdd, its trigger node coupled to ONESHOT1(OS1) (see below), and its clock input coupled to PHI1BAR (the inverted version of PHI1). Output voltage node Vout is coupled to capacitor C1 (also coupled to phi2bar) and to switch S1 (controlled by ONESHOT3 (OS3) (see below)). The other side of S1 is coupled to a node 30 which is in turn coupled via switch S2 to a fixed voltage source (in this case, ground) and is controlled by PHI1BAR. Node 30 is also coupled via capacitor C2 to voltage tripler output node Vpp. Second switching element 10b has its input voltage node coupled to Vdd, and its clock input coupled to PHI1BAR, its output voltage node coupled to Vpp. Its trigger is coupled to node 32 which is, in turn, coupled to a fixed voltage source (in this case, ground) via switch S3 under the control of ONESHOT1BAR and to PHI2BAR via capacitor C3. Node 32 is also coupled to the Vout node of third switching element 10c. Third switching element 10c's clock input is coupled to ONESHOT2BAR, its trigger is coupled to PHI2 and its input voltage node is coupled to Vdd through switch S4 under the control of ONESHOT1BAR.

The switch element 10c doesn't make a contribution to Vpp (the final charge pump voltage output) but only controls the trigger input to element 10b. The purpose of 10c in accordance with this embodiment of the present invention is to provide enhanced reliability to this circuit. Element 10c makes it such that there is less than a Vdd drop across any single junction. If the trigger voltage of switch element 10b was left at Vdd that would create a 3×Vdd-Vdd=2×Vdd drop across the gate-well junction of the triggering device within switching element 10b (24). Those of ordinary skill in the art will now realize that this device could easily be designed to handle that voltage, but element 10c makes that unnecessary. Either approach will work and thus the approach to be used in an actual implementation will be up to those responsible for its design.

Figure 7B:
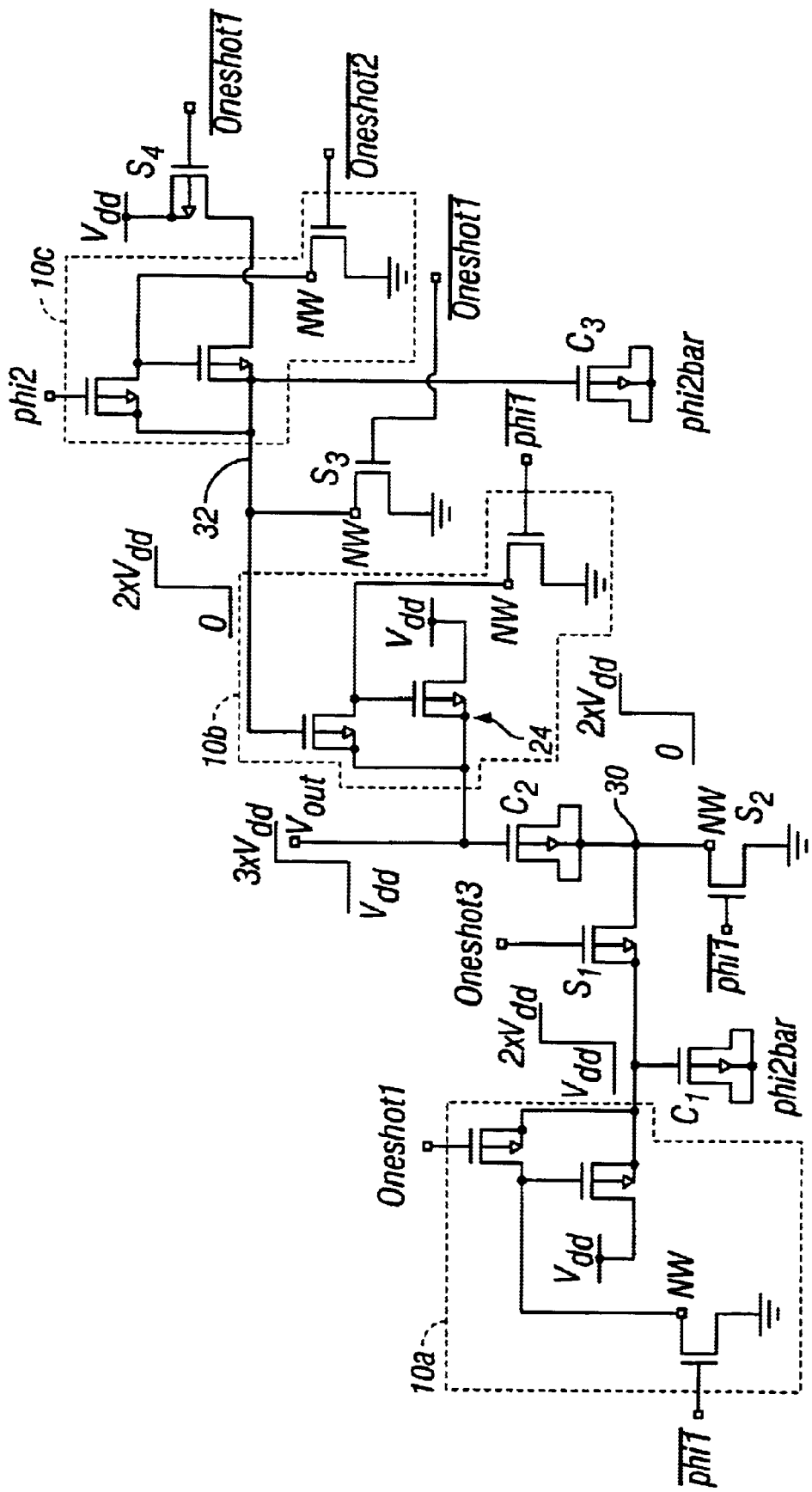
FIG. 7B is a detailed schematic diagram of the voltage tripler circuit of FIG. 7A.

FIG. 7B provides a device level schematic of the circuit of FIG. 7A. When designing circuits in accordance with the present invention, those of ordinary skill in the art will now realize that care must be taken to design the components for the voltages they are likely to experience. In this vein, for example, the drains of the NMOS transistors of the switching elements should preferably be in an n-well to provide additional Vds/Vdg breakdown protection. Another example is PMOS well transistor 24 of switching element 10b. Because of the elevated voltage present, Vgs may be 2×Vdd. This problem may be alleviated by designing the switching element transistors to handle the expected voltage or by splitting the voltage between 2 or more switching elements. Other techniques known to such skilled persons may also be used alternatively or in conjunction with those suggested herein.

Figure 8:
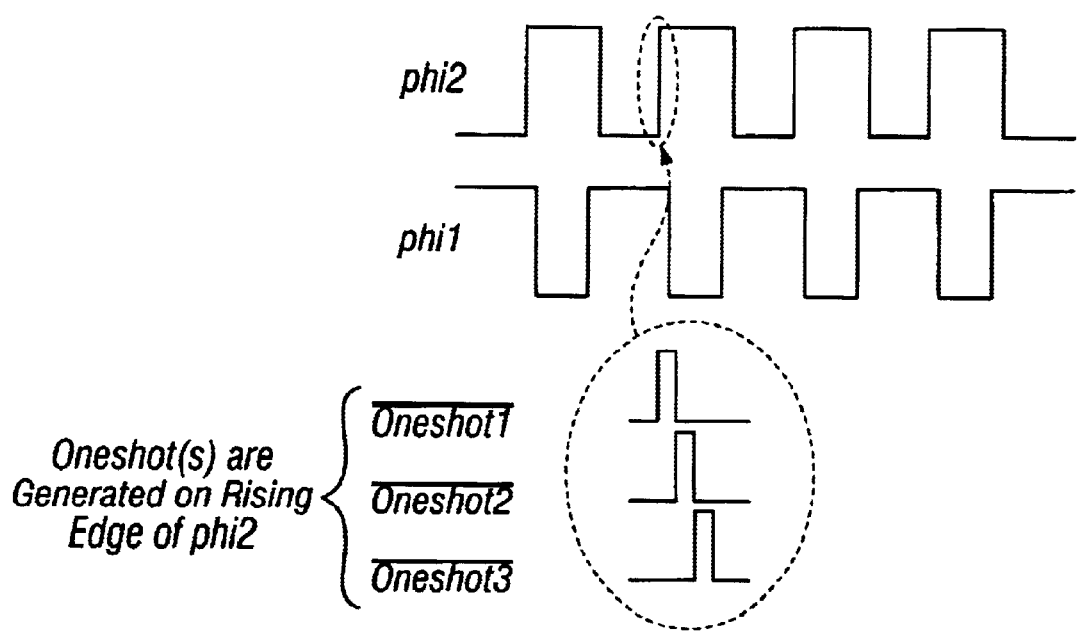
FIG. 8 is a timing diagram showing the timing signals used in FIGS. 7A and 7B in accordance with one embodiment of the present invention.

FIG. 8 illustrates the timing of PHI1, PHI2 (and by implication PHI1BAR and PHI2BAR), ONESHOT1BAR, ONESHOT2BAR and ONESHOT3BAR (and by implication ONESHOT1, ONESHOT2 and ONESHOT3). As illustrated, PHI1 and PHI2 are non-overlapping clock signals. ONESHOT1BAR, ONESHOT2BAR and ONESHOT3BAR are successively generated based on the rising edge of PHI2. ONESHOT1BAR, ONESHOT2BAR and ONESHOT3BAR are mutually nonoverlapping signals. PHI1 and ONESHOT1BAR, ONESHOT2BAR and ONESHOT3BAR are preferably never simultaneously asserted to avoid shorting Vdd to ground which could lead to electrical inefficiency and potential device damage. Such signals are easily generated with commonly available logic well understood by those of ordinary skill in the art and, accordingly, need not be described further herein.

Accordingly, a voltage multiplier switching element and a voltage tripler implemented using three instances of the voltage multiplier switching element have been disclosed. Those of ordinary skill in the art will now realize that it would be straightforward to scale the invention to any desired number of stages, or any desired output voltage and to provide feedback control from the output voltage to the clock circuitry to provide on-demand power generation for increased efficiency particularly for portable devices as such techniques are well-known in the pulse-width-modulation DC-DC power converter field and in the non-volatile memory field.

While embodiments and applications of this invention have been shown and described, it would be apparent to those skilled in the art having the benefit of this disclosure that many more modifications than mentioned above are possible without departing from the inventive concepts herein. For example, it is to be noted that while the present invention may be implemented in a single well single poly process and will work with low voltage processes (e.g., <=3 volts), the invention is not so limited and can be implemented in processes that support multiple polysilicon layers, multiple wells, and/or in higher voltage devices. Furthermore, the concept of an n-well as used herein is intended to encompass not only conventional n-well devices, but also NLDD (N-type Lightly Doped Drain) devices and other lightly doped, or isolated structures that increase the reliable gate-drain and drain-source voltages of the device so that it, in effect, behaves like a conventional n-well device in this respect. The invention, therefore, is not to be restricted except in the spirit of the appended claims.

What is claimed is:

1. A switching element for use in a charge pump circuit, the element comprising:

an input voltage node;

an output voltage node;

a ground node;

a first transistor having a gate, source and drain, the source and drain coupling a first circuit node and said ground node;

the gate of said first transistor coupled to a source of a first pumping signal;

a second transistor having a gate, source and drain, the source and drain coupling said input voltage node to said output voltage node;

the gate of said second transistor coupled to said first circuit node;

a third transistor having a gate, source and drain, the source and drain coupling the first circuit node to said output voltage node; and the gate of said third transistor coupled to a source of a second pumping signal.

2. The switching element in accordance with claim 1, wherein said first transistor is an NMOS transistor.

3. The switching element in accordance with claim 1, wherein said second transistor and said third transistor are PMOS well transistors.

4. The switching element in accordance with claim 1, wherein said first, second and third transistors are MOSFETs.

5. The switching element in accordance with claim 4, wherein said first transistor is an NMOS transistor and said second and third transistors are PMOS well transistors.

6. The switching element in accordance with claim 5, wherein said second and third transistors are disposed in an n-well of a semiconductor substrate.

7. A switching element for use in a charge pump circuit, the element comprising:
    an input voltage node;
    an output voltage node;
    a ground node;
    a NMOS transistor having a gate, source and drain, the source and drain coupling a first circuit node and said ground node;
    the gate of said NMOS transistor coupled to a source of a first pumping signal;
    a first PMOS well transistor having a gate, source and drain, the source and drain coupling said input voltage node to said output voltage node;
    the gate of said first PMOS well transistor coupled to said first circuit node;
    a second PMOS well transistor having a gate, source and drain, the source and drain coupling the first circuit node to said output voltage node; and
    the gate of said second PMOS well transistor coupled to a source of a second pumping signal.

8. The switching element in accordance with claim 7, wherein said first and second PMOS well transistors are disposed in an n-well of a semiconductor substrate.

9. The switching element in accordance with claim 7, wherein a first pumping signal carried on said source of a first pumping signal and a second pumping signal carried on said source of a second pumping signal are non-overlapping.

10. The switching element in accordance with claim 7, wherein the drain of said NMOS transistor is disposed in an n-well of a semiconductor substrate.

11. The switching element in accordance with claim 7, wherein the source of said NMOS transistor is coupled to said ground node.

12. The switching element in accordance with claim 7, wherein said input voltage node is coupled to Vdd.

13. The switching element in accordance with claim 7, wherein the wells of said first and second PMOS well transistors are coupled to said output voltage node.

14. A charge pump circuit, comprising:
    a semiconductor substrate;
    a first voltage input node;
    a second voltage input node;
    a source of a first pumping signal;
    a source of a second pumping signal;
    a source of a plurality of oneshot signals;
    a plurality of switching elements, each of said plurality of switching elements including
        an input voltage node coupled to said first voltage input node;
        an output voltage node coupled to a capacitor;
        a ground node coupled to said second voltage input node;
        a first transistor having a gate, source and drain, the source and drain coupling a first circuit node and said ground node, the gate of said first transistor coupled to a source of a first pumping signal;
        a second transistor having a gate, source and drain, the source and drain coupling said input voltage node to said output voltage node, the gate of said second transistor coupled to said first circuit node; and
        a third transistor having a gate, source and drain, the source and drain coupling the first circuit node to said output voltage node, the gate of said third transistor coupled to a source of a second pumping signal.

15. The circuit in accordance with claim 14, wherein said first transistor is an NMOS transistor.

16. The circuit in accordance with claim 14, wherein said second transistor and said third transistor are PMOS well transistors.

17. The circuit in accordance with claim 14, wherein said first, second and third transistors are MOSFETs.

18. The circuit in accordance with claim 17, wherein said first transistor is an NMOS transistor and said second and third transistors are PMOS well transistors.

19. The circuit in accordance with claim 18, wherein said second and third transistors are disposed in an n-well of a semiconductor substrate.

20. A method of implementing a stage of a charge pump, comprising:
    closing a switch coupled between a first voltage input node held at a first voltage level and a first circuit node;
    closing a first PMOS well transistor having its well coupled to its drain, its source coupled to a second voltage input node held at a second voltage level, its drain coupled to a second circuit node and its gate coupled to said first circuit node;
    charging a capacitor coupled between a third circuit node and said second circuit node until a potential at said second circuit node is equal to a potential of said second voltage input node;
    opening said switch;
    momentarily closing a second PMOS well transistor having its well coupled to its drain, its source coupled to said first circuit node and its drain coupled to said second circuit node;
    opening said first PMOS well transistor to isolate said second circuit node from said second voltage input node; and
    applying a signal to said third circuit node to raise the voltage at said second circuit node to a third voltage level higher than said second voltage level.

21. The method in accordance with claim 20, wherein said first voltage level is ground and said second voltage level is Vdd.

22. The method in accordance with claim 21, wherein said third voltage level is between Vdd and 2×Vdd.

23. The method in accordance with claim 20, wherein said switch is a NMOS transistor.

24. The method in accordance with claim 20, wherein said momentarily closing includes applying a one shot signal to a gate of said second PMOS well transistor.

25. The method in accordance with claim 20, wherein said applying. a signal includes applying a clock signal.

26. A method of implementing a stage of a charge pump, comprising:
    closing a first switch coupled between a first voltage input node held at a first voltage level and a first circuit node;
    closing a second switch having a first side coupled to a second voltage input node held at a second voltage level and second side coupled to a second circuit node, the switch controlled by said first circuit node;
    charging a capacitor coupled between a third circuit node and said second circuit node until a potential at said second circuit node is equal to a potential of said second voltage input node;
    opening said first switch;

momentarily closing a third switch having a first side coupled to said first circuit node and a second side coupled to said second circuit node;

opening said second switch to isolate said second circuit node from said second voltage input node; and applying a signal to said third circuit node to raise the voltage at said second circuit node to a third voltage level higher than said second voltage level.

27. The method in accordance with claim 26, wherein said first voltage level is ground and said second voltage level is Vdd.

28. The method in accordance with claim 27, wherein said third voltage level is between Vdd and 2×Vdd.

29. The method in accordance with claim 26, wherein said first switch is a NMOS transistor.

30. The method in accordance with claim 26, wherein said momentarily closing includes applying a one shot signal to control a state of said third switch.

31. The method in accordance with claim 26, wherein said applying a signal includes applying a clock signal.

32. The method in accordance with claim 29, wherein said second and third switches are PMOS well transistors each having its well and drain coupled together.

* * * * *

UNITED STATES PATENT AND TRADEMARK OFFICE
CERTIFICATE OF CORRECTION

PATENT NO. : 6,661,278 B1
DATED : December 9, 2003
INVENTOR(S) : Troy Gilliland

It is certified that error appears in the above-identified patent and that said Letters Patent is hereby corrected as shown below:

Column 2,
Line 66, replace "nonoverlapping" with -- non-overlapping --.

Signed and Sealed this

Twenty-first Day of September, 2004

JON W. DUDAS
*Director of the United States Patent and Trademark Office*